United States Patent [19]

Heusdens

[11] 3,911,159

[45] Oct. 7, 1975

[54] PROTEIN FIBER FORMING

[75] Inventor: Wilhelmus Heusdens, Kirkwood, Mo.

[73] Assignee: Ralston Purina Company, St. Louis, Mo.

[22] Filed: Nov. 5, 1973

[21] Appl. No.: 413,016

Related U.S. Application Data

[63] Continuation of Ser. No. 98,009, Dec. 14, 1970, abandoned.

[52] U.S. Cl. ................ 426/580; 426/656; 426/657
[51] Int. Cl.² .......................................... A23J 3/00
[58] Field of Search .......................... 426/364, 212

[56] References Cited
UNITED STATES PATENTS

| | | | |
|---|---|---|---|
| 3,047,395 | 7/1962 | Rusoff et al. | 426/104 |
| 3,662,671 | 5/1972 | Frederiksen et al. | 426/364 |

*Primary Examiner*—James R. Hoffman
*Attorney, Agent, or Firm*—Virgil B. Hill; Lawrence J. Hurst

[57] ABSTRACT

A process of continuously forming filamentous protein structures of improved tenderness is disclosed. The structures are formed from an aqueous slurry of a proteinaceous material and material, selected from the group consisting of cellulose and carbohydrate by-products from the processing of protein containing vegetable materials and grains said slurry having a solids content of at least about 20% by weight. The slurry should contain protein in an amount of at least about 40 percent by weight on a dry basis. The proteinaceous slurry is then formed into textured filamentous protein structures or fibers by continuously heating the slurry under pressure and cooling the slurry. The texture of the protein structures can be readily controlled by the process conditions, starting material, or reagents used in the process.

15 Claims, No Drawings

PROTEIN FIBER FORMING

This is a continuation of application Ser. No. 98,009 entitled PROTEIN FIBER FORMING filed on Dec. 14, 1970 now abandoned.

BACKGROUND OF THE INVENTION

Food scientists have been interested for some time in providing textured, fibrous protein products which can be produced from non-textured edible protein sources. The shortage of protein for human consumption is the most pressing food problem of our time. The problem is compounded by the difficulty in providing palatable protein foods from the available sources of protein. Many protein sources such as animal protein concentrates and byproducts, cereal proteins, oilseed protein, and microbial protein have not been fully utilized for human food because they are not in a form which is acceptable to humans. Humans prefer the mouthfeel of meat, which has definite texture and a fibrous quality. Most animal protein concentrates and by-products, cereal proteins, oilseed protein concentrates and microbial protein concentrates are in a paste or an amorphous powdered form. To make animal protein, oilseed protein, and microbial protein useful it is desirable to process them to give them a textured or fibrous quality which is appealing to humans.

Food scientists have, therefore, resorted to a variety of techniques to produce a structure protein. One of the most common and successful techniques has been the wet spinning process such as that disclosed in U.S. Pat. No. 2,730,447 to R. A. Boyer. The wet spinning process produces fibers by extruding a plurality of fine streams of an aqueous solution of protein into a chemical coagulating bath. The protein coagulates into fine fibers which are collected together and treated to form an edible textured protein. Another method of forming textured protein, particularly a cellular, expanded product, is by extrusion of protein as described in U.S. Pat. No. 3,496,858 to Sherman L. Jenkins.

U.S. Pat. No. 3,047,395 to Rusoff also describes a process for production of a protein food product having a shred-like texture of meat by coagulation of the protein material with heat, although agitation during heating is expressed as being necessary for formation of the shred-like structure. This process produces a tough product, which is not only unsuitable for some food uses such as an extender in meat patties, because of its poor chewing characteristics, but the process also because of requiring agitation during coagulation of the protein requires the use of special equipment to furnish agitation while heating and carrying out the process.

All of the above noted methods of producing textured protein, have drawbacks particular to each process, but generally in all cases still require special equipment necessitating a large capital expenditure to commercialize, as well as a further requirement of having a number of operative steps. In the case of the spinning process, described in the Patent to Boyer, even though it has been successful, it has required the use of a large amount of reagent chemicals in proportion to the amount of fibered protein produced. A particular problem also faced by current extrusion methods of producing textured or fibered protein even though they have been very successful, is the difficulty in producing a bland product, particularly when an oilseed protein is used as the starting material. Oilseeds, such as soybean, contain compounds which produce flatulence as well as an "off" or "beany" flavor in products which are made from the oilseed protein. To remove the flatulence causing compounds or the "beany" flavors from extruded protein fibers, for example, it is necessary to subject the fibers to further treatment to remove the objectionable compounds. The further treatment makes the process of producing fibered protein more complex and expensive.

SUMMARY OF THE INVENTION

The process of this invention produces a very tender, bland filamentous fiber which can be directly incorporated into simulated meat or other products to provide a pleasing taste and mouthfeel and to form a food product which is acceptable for human consumption. The process can be carried out on simple, readily available equipment and does not require a large amount of reagent chemicals. The process is inexpensive and simple to operate.

The invention involves heating a slurry of a proteinaceous material and a material selected from the group consisting of cellulose and carbohydrate by-products from the processing of protein containing vegetable materials and grains by conducting the slurry through a heat exchanger under high pressure. A slurry having a solids content of at least about 20 percent by weight is operative, the upper limit being dependent on the limitations of the pump employed to conduct the slurry. After the slurry passes through the heat exchanger, it may be cooled and pumped into a collecting zone. The filamentous protein is then recovered from the collecting zone and comprises very tender filaments of textured protein which are very suitable for a variety of food uses.

DESCRIPTION OF THE PREFERRED EMBODIMENTS

A variety of proteinaceous materials can be used in the slurry to produce filamentous fibers by the process of this invention; vegetable protein such as soy or other oilseed protein including concentrates, e.g., high purity soy isolates and soy meals or flakes; animal protein concentrates, such as albumen and casein; and microbial protein, from sources such as brewer's yeast, torula yeast, or petro protein can be used in the process of the invention. It is unnecessary that the protein material be of any particular purity, although it is preferable that the proteinaceous material as used in the slurry have a protein content above about 50 percent by weight on a dry basis. The proteinaceous material with a and may be added in an amount, dependent on its purity, to yield a protein concentration in the slurry of above about 40 percent by weight on a dry basis.

Fibers of a highly improved tenderness are obtained if the proteinaceous material, comprises a mixture of a protein concentrate and a material selected from the group consisting of cellulose and carbohydrate by-products from the processing of protein containing vegetable materials and grains. The material which is added to the slurry can be selected from a variety of materials and can comprise with equal effectiveness, mixtures of various materials which themselves are individually suitable. Among those materials which are considered suitable are various materials such as cellulose, or other carbohydrate by-products including those derived from the processing of various protein containing vegetable materials or grains. For example, dried corn cobs, which have been obtained from the shelling of whole corn is a suitable product, and which when ground may be effectively utilized in the present process. Likewise, various cellulose materials such as are derived from wood or paper processing such as dried and ground wood chips or wood pulp also may be utilized. Some of the more available materials which may be effectively utilized in the process of the present invention are those derived as by products from the processing of vegetable protein oilseeds. For example, the "spent" or extracted flakes of soybeans, which is the residual material remaining after removal of a majority of the protein to a protein isolate is both usable and available. Also various other products derived from processing of the protein in protein containing vegetable materials such as the oilseeds may be utilized, including those which are further processed to impart specifically defined functional properties although being closely related to the extracted or "spent" flakes of oilseeds. Such as product of the latter type is derived by the process described in U.S. Pat. application, Ser. No. 643,342 now abandoned to Robert P. Starr and is generally characterized as a product which comprises the material in vegetable oilseeds such as soybeans, remaining after substantially all of the oil has been solvent extracted therefrom; and the material has also been aqueously extracted with an alkaline material to remove a major portion of the aqueous alkaline soluble substances. There is a percentage of residual protein left unextracted in the residual matrix; and if the material is controllably dried, a product results which has good absorptive properties and improved emulsification characteristics.

Fibers of filamentous textured protein of an improved tenderness are obtained by forming a slurry of a proteinaceous material and material selected from the group connsisting of cellulose and carbohydrate by-products from the processing of protein containing vegetable materials and grains, and heating the slurry by conduction through a heat exchanger under pressure. The filamentous textured protein material which is obtained may be accordingly employed in various simulated meat products, although it is particularly suitable because of its tender quality for use as a meat extender in a meat loaf, hamburger pattie, or the like.

The slurry of a proteinaceous material and material selected from the group consisting of cellulose and carbohydrate by-products from the processing of protein containing vegetable materials and grains is formed by mixing and in an aqueous medium. Dependent on the purity of the protein material, the material may be other mixed in proportions of from about 0.3 to 1.5 times the weight on a dry basis of the weight of the protein source used. This range of addition holds true at least if the protein source has 90 – 100 percent protein on a dry basis. The actual properties will, of course, be dependent on the protein content of the protein source since the primary objective is to achieve a protein content in the slurry of above about 40% by weight on a dry basis. Therefore, the actual protein content of the protein concentrate is not critical to the practice of the present invention although as previously noted, in most cases, it is preferred that a material with a protein concentration above about 50% by weight on a dry basis be employed. The upper limit of protein concentration in the slurry is, of course, dependent upon the desired tenderness of the fibers, since, for example the addition of no material selected from the group consisting of cellulose and carbohydrate by-products from the processing of protein containing vegetable materials and grains produces a fiber which would be considered to be too tough for many food applications.

Although a material may have a very low protein content if a product derived from processing of vegetable oilseeds is employed, it will generally have a residual protein content which may be as high as 30 percent by weight on a dry basis. However, the residual protein which is left in this particular type of material is not considered to be functional for filamentous protein formation; and therefore, the percentage of protein is disregarded in calculating respective amounts and of protein and material that will be employed such that the protein content of the mixture or slurry will be at least about 40 percent by weight.

The material which is added to the slurry of the proteinaceous material, as noted, may be selected from a variety of materials to include various cellulosic, or other carbohydrate by by-products derived from the processing of grains or various protein containing vegetable materials. It is preferable that the cellaceous material be dried before addition to the slurry of the proteinaceous material. Although, a cellaceous material may be employed in a hydrated state or as perhaps the by-products normally derived from the processing of various high protein containing vegetable materials or products derived from non-proteinaceous or low protein containing materials, such as grains. In a continuous process, dry particulate cellaceous material is more readily handled and conveyed, and it is easier to mix the dry form into a slurry of proteinaceous material.

The exact degree of drying this material is not critical to the practice of the present invention and if the drying reduces the moisture content to between about 6% and 10 percent by weight, without otherwise altering or modifying the material, it is entirely satisfactory.

It is also preferable that the product be ground as well as dried before mixing with the protein concentrate in the aqueous slurry. The degree of grinding is also not critical to the practice of the invention, since the grinding is primarily only to control uniformity of the filamentous fiber and prevent a grainy texture being formed by the presence of large particles of the material. Preferably, however, the particle size to which the product will be ground is such that 100 percent by weight of the product will pass a standard 60 mesh screen.

For the process of the present invention to convert the protein into elongated filaments, the protein starting material should be in a sufficiently reactive form. This may be accomplished by hydration, if the protein source is dried or not already hydrated. Hence, the formation of the aqueous slurry of the proteinaceous materials and material selected from the group consisting of cellulose and carbohydrate by-products from the processing of protein containing vegetable materials and grains accomplishes this. The slurry and may also be subjected to a change in pH if necessary. Such a pH change and its effect will in great part, however, be influenced by the type of protein material employed as the proteinaceous source. Generally, the pH of the slurry will be maintained above about 4.5, with the exact pH being, of course, dependent on the protein material employed. The slurry may be adjusted also by raising the pH to a point well above the isoelectric point of the protein, even as high as between 8 and 12, although care must be used in employing high pH values, since it is necessary that the protein not be hydrolyzed to a point that will not react when processed by the method of the present invention. The advantage in employing a high pH or in otherwise adjusting the pH is to make the protein more soluble, again dependent on the specific protein and its pretreatment and hence, more reactive in the formation of the filamentous fibers. After raising the pH to this elevated level, adjustment of the pH is again made to near the isoelectric point of the protein but most generally above 4.5. For example, when soy protein is used as the protein source, the pH is adjusted between about 4 and 6 following elevation of the pH.

If the proper reagent materials are used, additional desirable properties may be imparted to the filamentous protein fibers. For example, various salts and hydroxides of certain polyvalent metals can act as linking agents to promote reaction and formation of the filamentous protein. Additionally, the use of a linking agent can permit, depending on the protein, carrying out formation of the fibers at considerably broader pH ranges. For example, with soy protein, if a linking agent such as calcium hydroxide, calcium chloride, aluminum sulfate and other salts and hydroxides of bivalent and trivalent metals such as magnesium and copper are used, the reaction can be carried out over a pH range of from 4 to 11. It is believed that perhaps these polyvalent metal ions promote or participate in the reaction which forms the protein structure.

Various other chemical agents may be added to the slurry of the proteinaceous material and material selected from the group consisting of cellulose and carbohydrate by-products from the processing of protein containing vegetable materials and grains to impart additional tenderness to the filamentous fibers, if so desired, beyond what may be attained without the use of such an agent. Among these materials which have been found effective are salts of phosphoric and citric acid, and more typically, the sodium salts which exhibit good water solubility. These materials as well as the aforementioned linking agents may be added in an amount between about 0.1 and 5.0 percent by weight on a dry basis of the solids in the slurry. The exact amount is dependent on the degree of tenderness desired and consequently, the specific food application to be made of the filamentous protein fibers.

The exact reaction which produces the filamentous protein structures is not known. However, it is theorized that the protein reacts under the temperature and pressure conditions of the process to produce elongated and filamentous multi-molecular protein polymers. It is also theorized that the material incorporated into the slurry from which the filamentous materials is formed increases the bulk density of the protein filaments to yield a filamentous protein structure which is highly tender in nature.

In the most general terms, the process for forming the filamentous protein fibers is carried out by conducting the slurry of the proteinaceous material and material selected from the group consisting of cellulose and carbohydrate by-products from the processing of protein containing vegetable materials and grains under confinement through a heating zone which is held at an elevated temperature and pressure, and from the heating zone to a cooling zone, which may also be a collecting zone for formation of the filamentous protein fibers. The filaments are, therefore, discharged into a collecting zone after emission either from a cooling zone, or directly from the heating zone itself and consist of elongated filamentous protein structures.

One of the most unique aspects of the present process as opposed to the prior art processes of Rusoff, Jenkins, or Boyer and as previously mentioned, is that the present process requires no special equipment for fiber formation. This eliminates and reduces production costs to a minimum, besides also providing a bland and tenderized protein structure. Illustrative of this unique characteristic, is the fact that the process may be carried out in equipment which is standard to the food or dairy industry. For example, the process is most conveniently carried out in a heat exchanger device, very commonly used in the dairy or food industry. The device in its most simple form consists of a continuous piece of tubing, preferably stainless steel, with the tubing suitably jacketed to be either heated or cooled, and thus serve as a heat exchanger device on whatever material is conducted through the tubing. The tubing may either be entirely jacketed and capable of heat exchange or may usually be intermittently jacketed to consist of a plurality of intermittent heat exchange zones, all of which may be maintained at different temperatures if desired. A typical heat exchanger setup will, therefore, usually involve three heat exchange zones in a continuous arrangement on the stainless steel tubing. Thus, in order to meet the requirements of elevated temperature and pressure as is necessary for the production of the filamentous protein structures of the present invention, the zones will all normally be maintained at an elevated temperature. However, all three zones may be so maintained; or alternately, the third heat exchange zone near the end of the tubing may be a cooling instead of a heating zone for cooling of the slurry prior to its exit from the heat exchanger. For the present process, the area immediately following the last heat exchange zone and upon exit from the heat exchanger is referred to as the collecting zone. This is, of course, the environment of atmospheric pressure and temperature into which the slurry is ejected from the heat exchanger and in which the filamentous protein structures are formed.

The requirement of pressure in the present process for formation of the tenderized filamentous protein structures is attained by placing a restricted orifice on the exit end of the heat exchanger. The use of a restricted orifice in combination with pumping or conducting the slurry under confinement in the tubing creates a back pressure which not only is necessary for fiber formation by the restricted orifice but also helps control the shape of the product. In general, circular orifices having a diameter between about 0.015 and 0.30 inches on a three-eighths inch OD tube have proven to be satisfactory for most applications. However, a rectangular shaped orifice with dimensions of 0.375 × .0625 inches on a three-eighths inch OD tube has also been used to produce filamentous protein structures although the fibers are flattened somewhat by the rectangular orifice.

Another device for performing the present process of producing filamentous protein fibers, which is also a well-known piece of equipment, is a "jet cooker." It also performs the process of the present invention, by heating the slurry under pressure by conduction through a zone under confinement whereby heat is applied, followed by conduction through an orifice into a collection or cooling zone to form filamentous protein fibers. Specifically, however, with a "jet cooker" the slurry of the proteinaceous material and material selected from the group consisting of cellulose and carbohydrate by-products from the processing of protein containing vegetable materials and gains is passed through adjacent jet nozzle orifices of the "jet cooker," which are concentric in nature. These jet nozzle orifices of the cooker comprise an injection zone whereby the mixture is heated and pressurized by steam added to the slurry and ejected along with the slurry from the jet nozzle orifices in intersecting flow patterns into a cooling or collecting zone. The cooling or collecting zone is normally the surrounding environment of atmospheric temperature and pressure. The time interval of the slurry in the jet nozzle is estimated to be about one second or less. The nozzle orifice through which the slurry is ejected is normally small, being only about one-eighth inch or so. The amount of steam which is used as a heating or pressurizing agent by injection into the slurry is not great, normally being an amount which will not lower the solids content of the suspension more than 1 to 2 percent by weight. The injection of steam to heat the slurry in combination with confinement of the slurry, and the use of the jet nozzle orifices of the "jet cooker," create an environment of pressure which is needed for formation of the filamentous protein fibers of the present invention.

The filamentous protein forming reaction as noted takes place as a function of temperature and pressure. Generally, temperatures of the material as low as 165° F. may be satisfactory to produce the filamentous protein structures depending on the protein used. Temperatures of between about 240° F. and 315° F. are preferred, especially for soy protein or egg albumen. After the protein material is heated in a heating zone, it may be alternately cooled, prior to ejection into a collecting zone. Typically a temperature of 160° F. to 210° F. will be used in the cooling zone.

The process may be operated over a wide pressure range, and the pressure is primarily created by the use of a restricted orifice in combination with heating and confinement of the slurry. The pressure attained will, therefore, in great part be dependent on the type of equipment used. For example, with heat exchanger devices, pressures varying between about 50 and 5000 psig may be used. With a "jet cooker" or a similar type of device which employs steam injection, steam pressure is usually about 80 – 85 psig and the pressure of the slurry in such a device is slightly above the steam pressure of 85 – 100 psig.

The following examples are added to be illustrative of my invention.

EXAMPLE 1

Clean, dehulled soybeans were ground and the oil extracted with hexane to give flakes, commonly called defatted soybean meal in a sense. The flakes were added to an aqueous bath, and a food grade alkaline reagent, calcium hydroxide, added until a pH of 10 was reached. The material was extracted for 30 minutes and then centrifuged to clarify the extract. The protein material was precipitated from the clarified liquor by adding phosphoric acid until the isoelectric point was reached at a pH of about 4.7. The precipitate was washed and centrifuged to concentrate the protein isolate. The isolate had a solids content of 26 percent by weight and a protein purity of 96.9 percent by weight on a dry basis. The protein isolate or concentrate had a pH of about 4.7 to 5.0.

A material was then obtained from the extracted flakes which had previously been solvent extracted and aqueously extracted with alkali to yield the protein extract described above. The resulting product after being aqueously extracted with alkali was separated from the soluble extract by wet mechanical screening. The product was slurried with water at a temperature of 80° F. for about 10 minutes and expressed in mechanical dewatering machinery into a semidried pulp. The semidried pulp representing approximately one-third of the original flakes "dry weight basis" was formed into granules and dried in a conventional tunnel drier at a temperature of 180° F. for a period of 90 minutes. The analysis of these dried granules showed them to have a protein content of 33 percent by weight and a moisture content of 7.0% by weight. The dried granules were then ground to a particle size such that 100 % by weight of the product will pass a 60 mesh screen.

The hydrated protein concentrate having a protein content of 96.9 percent by weight on a dry basis and a solids content of 26 percent by weight was slurried with 30 percent by weight of the dried and ground granules to yield a slurry having a protein concentration of 67.8 percent by weight solids on a dry basis and the solids content was reduced to about 20 percent by the addition of water. The slurry was pumped at a pressure of 350 – 450 psig through a three coil heat exchanger made of 50 feet of three-eighths inch OD seamless, stainless steel tubing within a six inch pipe. The temperature of the first heating zone of the heat exchanger was set at about 255° F., the second heating zone at 286° F., and the third zone of the heat exchanger at 266° F. The retention time in the heat exchanger at this pressure was about 10 – 15 seconds. The slurry passed through the heat exchanger, was expelled through a one-fourth inch × one sixty-fourth inch rectangular nozzle, and was cooled by dropping through ambient air to a collecting vessel. The fibers were recovered and the excess moisture removed. The fibers were light and extremely tender and had a moisture content of about 72 percent by weight. The fibers had tender but chewy characteristics and could be employed for a variety of food uses, as for example, being combined with other materials to produce a high grade meat extender.

EXAMPLE 2

The hydrated protein concentrate having a protein content of 96.9 percent by weight and a solids content of 26 percent by weight as produced in Example 1 was slurried with 50% by weight of the dried and ground granules as produced in Example 1 to yield a slurry having a protein concentration of 48.5 percent on a dry basis and the solids content was reduced to about 20 percent by the addition of water. The slurry was pumped at a pressure of 500 – 800 psig through a three coil heat exchanger made of 50 feet of three-eighths inch OD seamless, stainless steel tubing in a six inch pipe. The temperature of the first heating zone in the heat exchanger was set at about 255° F., the second heating zone at 286° F., the third zone or coil of the heat exchanger at 266° F. The retention time in the heat exchanger at this pressure was about 10 – 15 seconds.

The slurry passed through the heat exchanger, was expelled through a one-fourth inch × one sixty-fourth inch rectangular nozzle and was cooled by dropping through ambient air to a collecting vessel. The fibers were recovered and the excess moisture removed. The fibers were light and extremely tender, of medium length, and a somewhat thin character, and had a moisture content of about 75.3 percent by weight. The fibers had tender but chewy characteristics and could be employed for a variety of food uses as for example, being combined with other materials to produce a high grade meat extender.

EXAMPLE 3

The hydrated protein concentrate having a protein content of 96.9 percent by weight and a solids content of 26 percent by weight as produced in Example 1 was slurried with 60 percent by weight of the dried and ground granules as produced in Example 1 to yield a slurry having a protein concentration of 38.8 percent on a dry basis and the solids content was reduced to about 20 percent by the addition of water. The slurry was pumped at a pressure of 500 – 800 psig through a three coil heat exchanger made of 50 feet three-eighths inch OD seamless, stainless steel tubing in a six inch pipe. The temperature of the first heating zone of the heat exchanger was set at about 255° F., the second zone at about 286° F., and with the third zone of the heat exchanger at 266° F. The retention time in the heat exchanger at this pressure was about 10 – 15 seconds. The slurry passed through the heat exchanger, was expelled through a one-fourth inch × one sixty-fourth inch rectangular nozzle, and was cooled by dropping through ambient air to a collecting vessel. The fibers were recovered and the excess moisture removed. The fibers were light and extremely tender, of medium length, and a somewhat thin character, and had a moisture content of about 76.7 percent by weight. The fibers had tender but chewy characteristics and could be employed for a variety of food uses as for example, being combined with other materials to produce a high grade meat extender.

EXAMPLE 4

The hydrated protein concentrate having a protein content of 96.9 percent by weight on a dry basis and a solids content of 26 percent by weight was employed by itself without the addition of dried and ground material by slurrying the same to yield a slurry having a protein concentration of about 96.9 percent by weight solids on a dry basis and the solids content was reduced to about 20 percent by the addition of water. The slurry was pumped at a pressure of 350 – 450 psig through a three coil heat exchanger made of 50 feet three-eighths inch OD seamless, stainless steel tubing in a six inch pipe. The temperature of the first heating zone of the heat exchanger changer was set at about 255° F., the second heating zone at 286° F., and the third zone or coil of the heat exchanger at 266° F. The retention time in the heat exchanger at this pressure was about 10 – 15 seconds. The slurry passed through the heat exchanger, was expelled through a one-fourth inch × one sixty-fourth inch rectangular nozzle and was cooled by dropping through ambient air to a collecting vessel. The fibers were recovered and the excess moisture removed. The fibers were light and extremely tender, of medium length and a somewhat thin character, and had a moisture content of about 64.9 percent by weight. The fibers were medium size fibers, resembling ribbons, and were very chewy in nature but not nearly as tender as those fibers obtained in Examples 1, 2, and 3.

EXAMPLE 5

The fibrous materials produced as in Examples 1, 2, 3, and 4 were evaluated for tenderness by measuring shear compression force per gram of fibers on an Instrom tester using the CS-1 standard shear compression cell for the test. Results of these tests were as follows:

| Sample | Percent Protein (on a dry basis of slurry) | Percent Moisture | Shear Compression Force Per Gram of Sample |
|---|---|---|---|
| Example 1 | 67.8% | 72.0% | 15.0 |
| Example 2 | 48.5% | 75.3% | 8.3 |
| Example 3 | 38.8% | 76.7% | 3.8 |
| Example 4 | 96.9% | 64.9% | 24.3 |

It may be seen that the shear compression force which is required to break or shear the fiber is drastically reduced by the addition of the dried product to the slurry of protein material prior to fiber formation. It may be seen from the foregoing test that fibers which were produced with 30 to 60 percent by weight of the slurry, of the dried material, were remarkably more tender in character than corresponding fibers produced with the same protein concentrate as in Example 4 but without the addition of the dried material derived from vegetable protein.

The spirit and scope of my invention will be set forth in the appended claims and it is my intention to cover thereby all equivalents and modifications as may reasonably be included within their scope.

I claim:

1. A method of continuously forming discrete elongated tender protein filaments from proteinaceous material comprising:
   a. forming a pumpable slurry of a mixture of a protein containing material and an added material selected from the group consisting of cellulose and carbohydrate by-products from the processing of protein containing vegetable materials and grains; the slurry having a solids content of above about 20% by weight and a protein content of above about 40% by weight on a dry basis,
   b. hydrating the proteinaceous material in the slurry to place the proteinaceous material in a sufficiently reactive form to produce elongated protein filaments,
   c. forming discrete elongated protein filaments by continuously conducting the proteinaceous slurry under pressure through a heat exchange zone and heating the slurry to a temperature which is less than that which will degrade the protein, while the protein is subjected to such temperature for a sufficient period of time so that elongated tender filaments are separated from the remaining constituents of the slurry, continuously removing the heated slurry from said zone through a back pressure creating orifice and discharging the formed discrete elongated filaments and remaining constituents of the slurry into a collecting zone, and d. in said collecting zone separating the tender elongated protein filaments from the remaining constituents of the slurry and recovering said discrete filaments.

2. The method of claim 1 wherein the slurry is heated in the heat exchange zone to a temperature of above about 240°F.

3. The method of claim 1 wherein the slurry is heated with an injection heat exchanger in the heat exchange zone.

4. The method of claim 1 wherein the slurry is heated in the heat exchange zone to a temperature between about 240° – 315°F.

5. The method of claim 1 wherein the pressure to which the slurry is subjected in the heat exchange zone is between about 50 and 5,000 psig.

6. The method of claim 1 wherein the added material is cellulose.

7. The method of claim 1 wherein the protein containing material is selected from the group consisting of soy protein, albumen and casein.

8. A method of claim 1 wherein a chemical agent selected from the group consisting of phosphoric acid salts and citric acid salts is added to the slurry prior to heating.

9. The method of claim 1 wherein the step of hydrating the proteinaceous material is performed by grinding the slurry.

10. A method of continuously forming discrete elongated tender protein filaments from proteinaceous material comprising:
    a. forming a pumpable slurry of a mixture of a protein containing material and an added material selected from the group consisting of cellulose and carbohydrate by-products from the processing of protein containing vegetable materials and grains; the slurry having a solids content above about 20% by weight and a protein content of above about 40% by weight on a dry basis,
    b. hydrating the proteinaceous material in the slurry to place the proteinaceous material in a sufficiently reactive form to produce elongated protein filaments,
    c. forming discrete elongated protein filaments by continuously conducting the slurry under pressure through an injection zone whereby steam is injected into said slurry to heat the slurry and heating the slurry to a temperature which is less than that which will degrade the protein while the protein is subjected to such temperature for a sufficient period of time so that elongated tender filaments are separated from the remaining constituents of the slurry, continuously removing the heated slurry from said zone through an orifice and discharging the formed discrete elongated filaments and the remaining constituents of the slurry into a collecting zone, and
    d. in said collecting zone separating the tender protein filaments from the remaining constituents of the slurry and recovering said filaments.

11. The method of claim 10 wherein the slurry is processed at a steam pressure of between about 80 and 85 psig.

12. The method of claim 10 wherein the slurry is heated in the heat exchange zone to a temperature above 165°F.

13. The method of claim 10 wherein the added material is cellulose.

14. The method of claim 10 wherein the protein containing material is selected from the group consisting of soy protein, albumen and casein.

15. A method for continuously forming discrete elongated tender protein filaments from proteinaceous material comprising:
    a. forming a pumpable slurry of a protein containing material and an added material selected from the group consisting of cellulose and carbohydrate by-products from the processing of protein containing vegetable materials and grains; the slurry having a solids content of above about 20% by eight and a protein content of above about 40% by weight on a dry basis,
    b. hydrating the proteinaceous material in the slurry by adjusting the pH of the slurry to above about 4.5 to place the proteinaceous material in a sufficiently reactive form to produce elongated protein filaments, forming discrete elongated protein filaments by continuously conducting the proteinaceous slurry under pressure through a heat exchange zone and heating the slurry to a temperature above 240°F. and less than that which will degrade the protein while the protein is subjected to such temperature for a sufficient period of time so that elongated tender filaments are separated from the remaining constituents of the slurry, continuously removing the heated slurry from said zone through a back pressure creating orifice and discharging the formed discrete elongated filaments and remaining constituents of the slurry into a collecting zone, and
    d. in said collecting zone separating the tender elongated protein filaments from the remaining constituents of the slurry and recovering said discrete filaments.

* * * * *

UNITED STATES PATENT AND TRADEMARK OFFICE
CERTIFICATE OF CORRECTION

PATENT NO. : 3,911,159
DATED : October 7, 1975
INVENTOR(S) : Wilhelmus Heusdens

It is certified that error appears in the above-identified patent and that said Letters Patent are hereby corrected as shown below:

Column 3, line 51, after "the" and prior to "material" (second occurrence) insert --other--
        line 52, delete "other"

Column 4, line 14, after "amounts" and prior to "of" delete "and"
        line 15, after "and" and prior to "material" insert --added--
        line 21, delete "by" (first occurrence)
        line 59, delete "and" (second occurrence)

Column 6, line 1, "fibers" should read --filaments--
        line 2, "filaments" should read --fibers--

Column 7, line 8, "gains" should read --grains--

Column 12, line 27, "eight" should read --weight--

Signed and Sealed this first Day of June 1976

[SEAL]

Attest:

RUTH C. MASON
Attesting Officer

C. MARSHALL DANN
Commissioner of Patents and Trademarks